Figure 1:
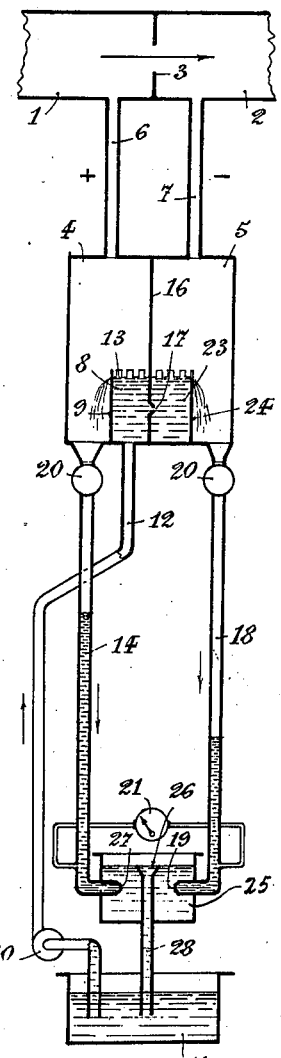

Dec. 22, 1942.  J. F. H. SEMET  2,306,142
FLUID MEASURING DEVICE
Filed March 9, 1940

Inventor
Jules François Henri Semet
By Cameron, Kerkam & Sutton
Attorneys.

Patented Dec. 22, 1942

2,306,142

UNITED STATES PATENT OFFICE 2,306,142

FLUID MEASURING DEVICE

Jules François Henri Semet, Paris, France; vested in the Alien Property Custodian Application March 9, 1940, Serial No. 323,229
In France March 10, 1939

2 Claims. (Cl. 73—205)

It is known to measure the delivery of a fluid in a conduit by means of the loss of head $h$ to which the fluid is subjected in particular in traversing a constriction, a Venturi or an orifice plate or the like disposed in the said conduit. However, as this loss of head $h$ is proportional, not to the velocity of flow of the fluid, but to the square of this velocity (and consequently to the square of the delivery), it is necessary, in order to compute the delivery, to rectify the parabolic curve which graphically represents the values furnished by this method, and, in order to compute the total flow of fluid in a given time, to integrate this same curve. However, this rectification and this integration may obviously be effected in a large number of ways.

Certain practical difficulties are encountered in measuring loss of head and determining the delivery from a conduit among which are the following disadvantages:

Owing to the fact that the apparatus generally directly utilises a difference of pressures which is proportional to the square of the delivery of the fluid, inaccuracy arises in the case of small heads.

On the other hand, since it is not practicable to create too high losses of head in the circuit of the fluid, the maximum value of the difference of pressure is limited and also does not permit of great intrinsic accuracy.

Finally, if the necessary integration is effected by mechanical or electrical means, such means involve the use of supplementary relays, which themselves constitute as many new possible sources of inaccuracy or error.

It has been proposed heretofore to measure the loss of head between two points of a conduit, which may or may not be separated by a constriction, and consequently the flow of a fluid in the said conduit, by means of a manometric system constituted by two chambers respectively subjected to the upstream and downstream pressure of the fluid, one of these chambers—that in which the upstream pressure obtains—comprising a constant-level vessel fed with an auxiliary fluid which is not miscible with but is denser than those with which it may have to come into contact (for example, with a heavy liquid such as mercury which will be hereinafter referred to), and communicating with another vessel or tube in which the surface of the liquid is subjected to the pressure obtaining in the second chamber, but which, instead of directly utilising the measurement of the difference of height existing between the constant level of the heavy liquid (mercury) in the first chamber and the level reached in the vessel or tube subjected to the downstream pressure, utilises the measurement of the delivery of the said heavy liquid which, in passing through a calibrated orifice or after having passed through a calibrated orifice, escapes from the vessel or tube in question, preferably at the same level as the overflow of the constant level of the first chamber.

It is known that under the conditions mentioned the delivery of the liquid traversing such a calibrated orifice is proportional to the square root of the difference of the pressures obtaining in the two chambers, that is to say, in fact, to the square root of the loss of head to which the fluid is subjected; and, as this loss of head is itself proportional to the square of the delivery of the fluid in the conduit under consideration, the measurement by suitable volumetric measuring devices of the delivery of heavy liquid which flows into the chamber at reduced pressure will furnish a value directly proportional to the delivery of the fluid to be measured.

If on the other hand pressure measurements are to be made instead of volumetric measurements, the disadvantage is still present that the difference in pressure is proportional to the square of the delivery. It has been proposed, in order to increase the sensitivity of such pressure measurements, to effect a conversion opposite to that which has already been carried out, so as to give the difference of pressure in question as high a relative value as is desired.

For this purpose, the aforesaid heavy liquid is received in a tube situated lower than the calibrated orifice referred to in the foregoing, and a second calibrated orifice is disposed at the bottom of this tube.

If care is taken to give this second calibrated orifice a section $s_1$ which has, with respect to the section $s$ of the first orifice, a reduced value, for example in the proportion $$\frac{s}{\sqrt{n}}$$

(where $n$ is any number larger than 1), it is simple to show that the difference of pressures $h_1$ (difference between the pressure obtaining immediately on the upstream side of the orifice of section $s_1$ and that of the medium into which this orifice delivers) for which the said delivery of the said second calibrated orifice will be equal to that of the first, in spite of the difference in section existing between them, will be finally equal to $n$ times the initial loss of head $h$.

The discharge from the second orifice can, of course, be measured volumetrically in the same way as the discharge from the first orifice. When pressure measurements are taken, however, the differences of pressures to be finally measured are $n$ times greater than with only the first orifice, the obvious result being to increase in the same proportions the sensitivity and the accuracy of the apparatus employed. Nevertheless, the difficulty remains that the differences of pressure so determined are proportional to the square of the velocity of the fluid in the conduit.

The present invention relates to pressure measuring apparatus embodying provisions for increased sensitivity of reading as described above, but arranged in such a way that the measurement of pressure difference, as by means of a differential manometer, automatically rectifies the parabolic function without any source of error and with a great multiplication of sensitivity.

Figure 2:
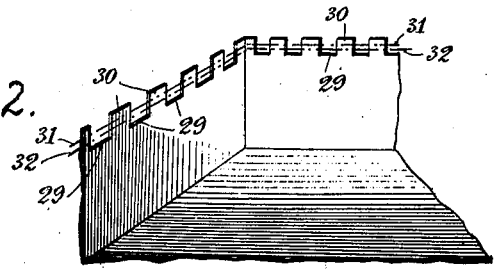

In the accompanying drawing, wherein like reference characters indicate like parts throughout the several views, Figure 1 is a general diagrammatic illustration of one constructional form of the arrangement according to the invention, and Figure 2 is a perspective view showing a fragment of a special overflow permitting of maintaining at a substantially constant level the plane of discharge of the same viscous (heavy) liquid or non-wetting liquid such as mercury.

In Figure 1, 1 and 2 designate the two sections of the conduit in which it is proposed to measure the loss of head and the delivery of a fluid, and which are situated respectively on the upstream side and on the downstream side of an orifice plate 3 provided with a calibrated orifice and intended to accentuate the loss of head so as to facilitate the installation of the delivery measuring arrangement.

Two adjacent fluid-tight chambers 4 and 5, the first of which communicates with the upstream section 1 through a pipe 6 while the second communicates with the downstream section 2 through a pipe 7, constitute the manometric arrangement sensitive to the differential pressure $h$ set up by the loss of head to which the fluid is subjected in traversing the orifice plate 3. The pressure in the chamber 4 is therefore higher than that in the chamber 5 by the value of this loss of head.

In the chamber 4 there is provided, according to the invention, an open compartment 8, comprising a wall 9 forming an overflow, for a heavy liquid, such as mercury, drawn by a pump 10 from a reservoir 11 and conveyed through a pipe 12 into the said compartment. In order to ensure a very substantially constant level 13 in the said compartment 8, the delivery of the pump is so regulated that the mercury constantly flows over the crest of the wall 9. The mercury thus flowing over into the chamber 4 escapes through a pipe 14 as hereinafter described.

The chambers 4 and 5 are separated by a wall 16, in which is provided a calibrated orifice 17 below the level 13 of the mercury in the compartment 8, and opening into a similar compartment 23 formed in the chamber 5 and limited by a transverse wall 24 forming an overflow at the same level as the overflow 9. The two compartments 8 and 23 thus constitute a system of communicating vessels in which the free surface of the liquid is subjected, in one of the vessels, to the pressure of the fluid on the up-stream side of the orifice plate, while in the other vessel it is subjected to the pressure of the fluid on the down-stream side of said orifice plate.

Owing to the fact that the pressure in the chamber 5 is lower than that in the chamber 4, a certain quantity of mercury constantly flows through the calibrated orifice 17, and, as has been stated, this quantity is proportional to the square root of the difference $h$ of the pressures in the two chambers and directly proportional to the delivery of fluid to be measured in the conduit 1—2.

The mercury falling into the chamber 5 is received in a pipe 18, whence it is discharged as hereinafter described. The pipes 14 and 18 may be provided with suitable liquid seals indicated diagrammatically at 20.

The pump 10 is a volumetric pump having constant delivery, the constancy of the delivery of which may be assured by any suitable known means, for example by a discharge under constant pressure.

The pipes 14 and 18 receiving the mercury coming from the constant level overflow 13 in the compartment 8 of the chamber 4 and from the constant level overflow in the compartment 23 of the chamber 5 are joined to a tank 25, in which the pipe 14 is terminated by a calibrated orifice 27 disposed, in the mercury, opposite and at the same level as a calibrated orifice 19 terminating the pipe 18. An overflow, followed by a conduit 28 for return to the reservoir 11, permits of establishing a constant level 26 in the said tank.

A differential manometer 21 branched from the two conduits 14 and 18, on the same plane as the constant level 26, measures the differences of the heads of which the respective deliveries through the calibrated orifices 19 and 27 are a function.

If the variations of this difference are noted, it will be seen that they follow a law which is linear as a function of the delivery of mercury through the orifice 19 and therefore also linear as a function of the delivery of fluid to be measured. Therefore, in this way, an automatic rectification of the parabolic function may be realised without any source of error and with a great multiplication of sensitivity.

It is also simple to show mathematically the accuracy of this result.

Let $Q_1$ be the delivery through the orifice 19.
Let $Q_2$ be the delivery through the orifice 27.
Let $Q$ be the sum $Q_1+Q_2$=constant by hypothesis (delivery of the pump).
Let $h_1$ be the useful head of mercury above 19.
Let $h_2$ be the useful head of mercury above 27.
Let $s_1$ be the section of the calibrated orifice 19.
Let $s_2$ be the section of the calibrated orifice 27.
Let $a_1$ equal $ks_1$ and $a_2$ equal $ks_2$ where $k$ designates a constant.

It is known that the laws of flow through calibrated orifices imply:

$$Q_1{}^2=a_1{}^2h_1 \text{ and } Q_2{}^2=a_2{}^2h_2$$

From which is derived:

$$Q_1{}^2-Q_2{}^2=a_1{}^2h_1-a_2{}^2h_2$$

But, $$Q_1{}^2-Q_2{}^2=(Q_1+Q_2)(Q_1-Q_2)=Q(Q_1-Q_2)$$

Whence:

$$Q_1-Q_2=\frac{1}{Q}(a_1{}^2h_1-a_2{}^2h_2)$$

Now, $$Q_1+Q_2=Q$$

From this is derived:

$$2Q_1=Q+\frac{1}{Q}(a_1{}^2h_1-a_2{}^2h_2)$$

For $Q_1=0$, this equation gives:

$$0=Q+\frac{1}{Q}(a_1{}^2h_{1(0)}-a_2{}^2h_{2(0)})$$

By subtracting the two latter equations term by term, there is obtained:

$$Q_1 = \frac{1}{2Q}(a_1^2 h_1 - a_2^2 h_2 - (a_1^2 h_{1(0)} - a_2^2 h_{2(9)}))$$

that is to say, to a constant:

$$Q_1 = 1/2Q(a_1^2 h_1 - a_2^2 h_2) - K$$

where K is a constant.

This shows that $Q_1$ varies lineally as a function of $a_1^2 h_1 - a_2^2 h_2$, that is to say, as a function of $h_1 - h_2$.

In the differential manometer 21, the surfaces of action of each pressure will have to be proportional to the coefficients $a_1^2$ and $a_2^2$, that is to say, to the square of the sections of the orifices 19 and 27. If, as may easily be done, calibrated orifices of equal section are selected, then $Q_1$ is a direct linear function of $h_1 - h_2$, and vice versa.

It is, moreover, obvious that the differential manometer is not the only instrument which permits of following the variations of $Q_1$ by the measurement of the differences of head at the two orifices.

It is to be noted that in the constructional example shown in Figure 1, the arrangement does not permit of the totalisation of the flow of liquid since the pipe 28 returns to the reservoir 11 the mercury coming from the two compartments 8 and 23; it therefore does not permit of measuring the total flow of the fluid. The changes that would be necessary in order to render the apparatus simultaneously suitable as a measuring device will be obvious to those skilled in the art.

It is to be pointed out that the arrangements according to the present invention employ at various points overflows intended to maintain a very substantially constant level in spite of the variable deliveries passing over these overflows. When the liquid employed wets the walls, it is sufficient to make the overflows of such width that the thickness of the sheet flowing over is negligible in all circumstances; but when a viscous liquid or a non-wetting liquid, such as mercury, is employed, experience shows that even on a wide overflow the liquid collects at one point and then flows over in sheets of which the height varies considerably with the delivery and which form in this way a constant level which is too inaccurate for the requirements of the apparatus.

According to the invention, the overflow is, as is shown in Figure 2, constituted by a series of elementary overflows 29 several millimetres wide, having vertical or oblique edges, separated by extensions 30 of the wall which form an obstacle to the flow.

Taken separately, the flow over such an elementary overflow in the form of a notch takes place when the level reaches 31 and ceases when it falls to 32, these two levels being separated by a fraction of a millimetre (about one-tenth of a millimetre).

On the other hand, when the delivery commences it does not increase regularly but immediately reaches a finite value $q$.

These phenomena are due to the effects of capillarity.

Taken in combination, a certain number of elements of notch form function successively because, owing to the laws of chance, there is always one notch commencing, which causes a slight contraction of the level and a capillary suction which delays the commencement of the others.

Consequently, it will be seen that the flow commences successively at the different notches.

If the number of notches is equal to $n$ and the volume of liquid to overflow never exceeds $nq$, none of the elementary overflows need function beyond its immediate commencing volume, and the level never exceeds the level 31.

Thus, even with non-wetting liquids a very precise level is obtained.

I claim:

1. In a device for measuring loss of head and delivery of a fluid in a conduit by utilizing the difference in pressure between two points in said conduit created by the flow of fluid therethrough, the combination of a chamber communicating with said conduit at the point of relatively higher pressure, a second chamber communicating with said conduit at the point of relatively lower pressure, said first named chamber comprising a constant level reservoir for an auxiliary fluid nonmiscible with and of greater density than the fluid in said conduit, means for supplying auxiliary fluid to said reservoir, a second constant level reservoir associated with said second chamber and having its level in substantially the same plane as that of said first reservoir, means including a calibrated orifice positioned below the levels of said reservoirs for delivering auxiliary fluid from said first to said second reservoir, means for discharging from said first chamber the overflow from said first reservoir, including a second calibrated orifice through which said auxiliary fluid flows, means for discharging from said second chamber the overflow from said second reservoir, including a third calibrated orifice through which said auxiliary fluid flows in series with said first orifice, and a container into which said auxiliary fluid is discharged from both said second and said third orifices, said second and third orifices being positioned at substantially the same level and below that of the auxiliary fluid in said container, whereby the difference between the pressure heads acting on said second and third orifices is at all times a linear function of the delivery of fluid in said conduit.

2. In a device for measuring the delivery of fluid through a conduit, the combination of a constant level reservoir for an auxiliary fluid, means communicating with said conduit at a point of relatively high pressure for maintaining said pressure on the surface of the auxiliary fluid in said reservoir, means for supplying auxiliary fluid in constant volume to said reservoir, a second constant level reservoir for said auxiliary fluid, means communicating with said conduit at a point of relatively low pressure for maintaining said relatively low pressure on the surface of the auxiliary fluid in said second reservoir, means including a calibrated orifice for delivering auxiliary fluid from said first to said second reservoir, means for discharging the overflow from said first reservoir including a second calibrated orifice, means for discharging the overflow from said second reservoir comprising a third calibrated orifice, the auxiliary fluid from said second and third orifices being discharged at the same level whereby the differences in the heads on said second and third orifices, measured above said same discharge level, is a linear function of the delivery of fluid through said conduit.

JULES FRANÇOIS HENRI SEMET.